United States Patent
Noble

(10) Patent No.: US 7,899,057 B2
(45) Date of Patent: Mar. 1, 2011

(54) SYSTEMS FOR ORDERING NETWORK PACKETS

(75) Inventor: Gayle L. Noble, Boulder Creek, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 562 days.

(21) Appl. No.: 11/413,829

(22) Filed: Apr. 28, 2006

(65) Prior Publication Data

US 2007/0253402 A1 Nov. 1, 2007

(51) Int. Cl.
H04L 12/56 (2006.01)

(52) U.S. Cl. .......................................... 370/394; 709/238

(58) Field of Classification Search .......................... None
See application file for complete search history.

(56) References Cited

U.S. PATENT DOCUMENTS

| | | | |
|---|---|---|---|
| 4,340,932 A | 7/1982 | Bakula et al. | |
| 4,468,728 A | 8/1984 | Wang | |
| 4,611,272 A | 9/1986 | Lomet | |
| 4,775,956 A | 10/1988 | Kaji et al. | |
| 4,866,701 A * | 9/1989 | Giacopelli et al. | 370/411 |
| 4,879,630 A | 11/1989 | Boucard et al. | |
| 4,891,803 A * | 1/1990 | Huang et al. | 370/411 |
| 5,390,359 A | 2/1995 | Damerau | |
| 5,416,769 A * | 5/1995 | Karol | 370/414 |
| 5,459,731 A | 10/1995 | Brief | |
| 5,461,614 A * | 10/1995 | Lindholm | 370/394 |
| 5,500,858 A * | 3/1996 | McKeown | 370/412 |
| 5,625,371 A | 4/1997 | Miller et al. | |
| 5,659,680 A | 8/1997 | Cunningham et al. | |
| 5,724,509 A | 3/1998 | Starkweather et al. | |
| 5,786,921 A | 7/1998 | Wang et al. | |
| 5,793,871 A | 8/1998 | Jackson | |

(Continued)

FOREIGN PATENT DOCUMENTS

WO 2004097576 11/2004

(Continued)

OTHER PUBLICATIONS

*EZchip Announces the NP-1c, Its Second Generation 10-Gigabit Network Processor*; http://www.ezchip.com/html/press_021021.html; Oct. 21, 2002; 4 pages.

(Continued)

*Primary Examiner* — Daniel J Ryman
*Assistant Examiner* — Brian Roberts
(74) *Attorney, Agent, or Firm* — Matthew A. Pequignot; Pequignot + Myers LLC

(57) ABSTRACT

Systems for ordering network packets. In one example embodiment, a networking system includes a processor and memory. The memory has stored thereon a routing data structure, a transaction data structure, and first packet-route-to data. The processor is configured to receive a packet; to copy second route-to data from an entry in the routing data structure to the first packet-route-to data, the entry being associated with an identifier associated with the packet, the second route-to data comprising a value indicating that the packet should be routed back to the processor; to determine whether the packet is in order; to, when the packet is in order, copy third route-to data to the first packet-route-to data, the third route-to data comprising a value indicating that the packet should be routed to a destination; and to route the packet according to the first packet-route-to data.

8 Claims, 7 Drawing Sheets

U.S. PATENT DOCUMENTS

| | | | |
|---|---|---|---|
| 5,841,982 A | 11/1998 | Brouwer et al. | |
| 5,847,708 A | 12/1998 | Wolff | |
| 5,850,388 A | 12/1998 | Anderson et al. | |
| 5,884,072 A | 3/1999 | Rasmussen | |
| 5,978,947 A | 11/1999 | Kim et al. | |
| 6,115,680 A | 9/2000 | Coffee et al. | |
| 6,163,681 A | 12/2000 | Wright et al. | |
| 6,246,684 B1 * | 6/2001 | Chapman et al. | 370/394 |
| 6,266,789 B1 | 7/2001 | Bucher et al. | |
| 6,298,047 B1 | 10/2001 | Steffes et al. | |
| 6,393,341 B1 | 5/2002 | Lawrence et al. | |
| 6,393,587 B2 | 5/2002 | Bucher et al. | |
| 6,467,053 B1 | 10/2002 | Connolly et al. | |
| 6,473,794 B1 | 10/2002 | Guheen et al. | |
| 6,480,313 B1 | 11/2002 | Kawamura | |
| 6,507,923 B1 | 1/2003 | Wall et al. | |
| 6,618,368 B1 | 9/2003 | Tanigawa et al. | |
| 6,662,009 B2 | 12/2003 | Lynn | |
| 6,674,724 B1 | 1/2004 | Main et al. | |
| 6,678,275 B1 | 1/2004 | DeGrandpre et al. | |
| 6,686,759 B1 | 2/2004 | Swamy | |
| 6,691,165 B1 | 2/2004 | Bruck et al. | |
| 6,697,379 B1 | 2/2004 | Jacquet et al. | |
| 6,714,217 B2 | 3/2004 | Huang et al. | |
| 6,738,645 B2 | 5/2004 | Knight | |
| 6,745,011 B1 | 6/2004 | Hendrickson et al. | |
| 6,754,488 B1 | 6/2004 | Won et al. | |
| 6,791,956 B1 | 9/2004 | Leu | |
| 6,801,756 B1 | 10/2004 | Agrawal et al. | |
| 6,801,949 B1 | 10/2004 | Bruck et al. | |
| 6,839,321 B1 | 1/2005 | Chiruvolu | |
| 6,842,429 B1 | 1/2005 | Shridhar et al. | |
| 6,850,483 B1 | 2/2005 | Semaan | |
| 6,853,620 B2 | 2/2005 | Mauritz et al. | |
| 6,880,070 B2 | 4/2005 | Gentieu et al. | |
| 6,910,149 B2 | 6/2005 | Perloff et al. | |
| 6,931,574 B1 | 8/2005 | Coupal et al. | |
| 6,934,477 B2 | 8/2005 | Willebrand | |
| 6,941,482 B2 | 9/2005 | Strong | |
| 6,954,789 B2 | 10/2005 | Dietz et al. | |
| 6,970,917 B1 | 11/2005 | Kushwaha et al. | |
| 6,996,418 B2 | 2/2006 | Teo et al. | |
| 7,003,080 B1 | 2/2006 | Doskow et al. | |
| 7,007,208 B1 | 2/2006 | Hibbert et al. | |
| 7,027,808 B2 | 4/2006 | Wesby | |
| 7,062,264 B2 | 6/2006 | Ko et al. | |
| 7,100,092 B2 | 8/2006 | Allred et al. | |
| 7,110,954 B2 | 9/2006 | Yung et al. | |
| 7,120,149 B2 * | 10/2006 | Salamat | 370/394 |
| 7,181,663 B2 | 2/2007 | Hildebrandt | |
| 7,194,503 B2 | 3/2007 | Shell et al. | |
| 7,206,972 B2 | 4/2007 | Wilson et al. | |
| 7,224,968 B2 | 5/2007 | Dobson et al. | |
| 7,257,741 B1 | 8/2007 | Palenik et al. | |
| 7,283,816 B2 | 10/2007 | Fok et al. | |
| 7,286,510 B2 | 10/2007 | Wang et al. | |
| 7,286,515 B2 | 10/2007 | Olson et al. | |
| 7,286,647 B2 | 10/2007 | Stormon et al. | |
| 7,313,113 B1 | 12/2007 | Hills et al. | |
| 7,330,662 B2 | 2/2008 | Zimmerman | |
| 7,343,524 B2 | 3/2008 | Klotz et al. | |
| 7,349,692 B2 | 3/2008 | Ko et al. | |
| 7,372,848 B2 | 5/2008 | Doerr et al. | |
| 7,380,154 B2 | 5/2008 | Gale et al. | |
| 7,457,312 B2 | 11/2008 | Weiss et al. | |
| 7,483,974 B2 | 1/2009 | Goud et al. | |
| 7,522,904 B1 | 4/2009 | Zhu | |
| 7,523,198 B2 | 4/2009 | Wu et al. | |
| 7,526,322 B2 | 4/2009 | Whistler | |
| 7,545,740 B2 | 6/2009 | Zelig et al. | |
| 7,551,922 B2 | 6/2009 | Roskowski et al. | |
| 2001/0016925 A1 | 8/2001 | Bucher | |
| 2001/0049263 A1 | 12/2001 | Zhang | |
| 2002/0025795 A1 | 2/2002 | Sharon et al. | |
| 2002/0044662 A1 | 4/2002 | Sowler | |
| 2002/0055999 A1 | 5/2002 | Takeda | |
| 2002/0068600 A1 | 6/2002 | Chihara et al. | |
| 2002/0078178 A1 | 6/2002 | Senoh | |
| 2002/0112041 A1 | 8/2002 | Viscount et al. | |
| 2002/0122050 A1 | 9/2002 | Sandberg | |
| 2002/0161875 A1 | 10/2002 | Raymond | |
| 2002/0181405 A1 | 12/2002 | Ying | |
| 2002/0181506 A1 | 12/2002 | Loguinov | |
| 2003/0038769 A1 | 2/2003 | Turpin et al. | |
| 2003/0048854 A1 | 3/2003 | Kaku | |
| 2003/0157895 A1 | 8/2003 | Agrawal et al. | |
| 2003/0167405 A1 | 9/2003 | Freund et al. | |
| 2003/0204781 A1 | 10/2003 | Peebles et al. | |
| 2003/0220112 A1 | 11/2003 | Bugeja | |
| 2004/0006633 A1 | 1/2004 | Chandra et al. | |
| 2004/0015317 A1 | 1/2004 | Klotz et al. | |
| 2004/0054680 A1 | 3/2004 | Kelley et al. | |
| 2004/0057389 A1 | 3/2004 | Klotz et al. | |
| 2004/0076194 A1 | 4/2004 | Okamoto et al. | |
| 2004/0100963 A1 * | 5/2004 | Guo | 370/394 |
| 2004/0107391 A1 | 6/2004 | Bauman | |
| 2004/0133733 A1 | 7/2004 | Bean et al. | |
| 2004/0153267 A1 | 8/2004 | Fishman et al. | |
| 2004/0177344 A1 | 9/2004 | Kuo | |
| 2004/0185876 A1 | 9/2004 | Groenendaal et al. | |
| 2004/0199568 A1 | 10/2004 | Lund | |
| 2004/0203379 A1 | 10/2004 | Witkowski et al. | |
| 2004/0225916 A1 | 11/2004 | Clark | |
| 2004/0242197 A1 | 12/2004 | Fontaine | |
| 2004/0255191 A1 | 12/2004 | Fox et al. | |
| 2004/0264448 A1 | 12/2004 | Wise et al. | |
| 2005/0013300 A1 | 1/2005 | Akahane et al. | |
| 2005/0034055 A1 | 2/2005 | Rangan et al. | |
| 2005/0050190 A1 | 3/2005 | Dube | |
| 2005/0060402 A1 | 3/2005 | Oyadomari et al. | |
| 2005/0060403 A1 | 3/2005 | Bernstein et al. | |
| 2005/0078606 A1 | 4/2005 | Bernstein et al. | |
| 2005/0078692 A1 | 4/2005 | Gregson | |
| 2005/0085259 A1 | 4/2005 | Conner et al. | |
| 2005/0114083 A1 | 5/2005 | Bullis | |
| 2005/0120269 A1 | 6/2005 | Larson | |
| 2005/0166023 A1 | 7/2005 | Kasako et al. | |
| 2005/0172161 A1 | 8/2005 | Cruz et al. | |
| 2005/0185597 A1 | 8/2005 | Le et al. | |
| 2005/0185658 A1 | 8/2005 | Kamiwada | |
| 2005/0232284 A1 | 10/2005 | Karaoguz et al. | |
| 2005/0232291 A1 | 10/2005 | Brown et al. | |
| 2005/0249214 A1 | 11/2005 | Peng | |
| 2005/0254488 A1 | 11/2005 | Huang | |
| 2005/0257104 A1 | 11/2005 | Wood | |
| 2005/0260982 A1 | 11/2005 | Ko et al. | |
| 2006/0058982 A1 | 3/2006 | Yamada et al. | |
| 2006/0095174 A1 | 5/2006 | Sonnenrein et al. | |
| 2006/0101271 A1 | 5/2006 | Thomas | |
| 2006/0117300 A1 | 6/2006 | Puthukattukaran et al. | |
| 2006/0198312 A1 | 9/2006 | Schondelmayer et al. | |
| 2006/0198318 A1 | 9/2006 | Schondelmayer et al. | |
| 2006/0198319 A1 | 9/2006 | Schondelmayer et al. | |
| 2006/0200708 A1 | 9/2006 | Gentieu et al. | |
| 2006/0200711 A1 | 9/2006 | Schondelmayer et al. | |
| 2006/0205398 A1 | 9/2006 | Seckendorf et al. | |
| 2006/0230134 A1 | 10/2006 | Qian et al. | |
| 2006/0230312 A1 | 10/2006 | Nichols et al. | |
| 2006/0246845 A1 | 11/2006 | Lawson et al. | |
| 2006/0264178 A1 | 11/2006 | Noble et al. | |
| 2007/0086351 A1 | 4/2007 | Noble et al. | |
| 2007/0087741 A1 | 4/2007 | Noble et al. | |
| 2007/0087771 A1 | 4/2007 | Noble et al. | |
| 2007/0088981 A1 | 4/2007 | Noble et al. | |
| 2007/0099567 A1 | 5/2007 | Chen et al. | |
| 2007/0146782 A1 | 6/2007 | Lehotsky et al. | |
| 2007/0287450 A1 | 12/2007 | Yang et al. | |
| 2008/0008128 A1 | 1/2008 | Nagarajan et al. | |
| 2009/0254650 A1 | 10/2009 | Sheppard | |

FOREIGN PATENT DOCUMENTS

WO 2005/018162 A1 2/2005

OTHER PUBLICATIONS

*NP-1c 10-Gigabit 7-Layer Network Processor with Integrated Search Engines*; 2003; 2 pages.

*TOPcore™ EZchip's Task Optimized Processing Core Technology*; http://web.archive.org/web/20040204074648/http://www.ezchip.com/html/tech_r.html; Feb. 4, 2004; 4 pages.
*NP-1c Network Processor10-Gigabit 7 -Layer Network Processor with Integrated Search Engines*; http://www.ezchip.com/html/pr_np-1c.html; Jul. 21, 2004; 5 pages.
*Performance Benchmarks*; http://www.ezchip.com/html/pr_benchmarks.html; Jul. 28, 2004; 3 pages.
*EZchip provides a complete solution for implementing high-speed network processing with advanced features*; http://www.ezchip.com/html/prod_r.html; Aug. 4, 2004; 2 pages.
*NP-1c Network Processor10-Gigabit Network Processor with Integrated Search Engines*; http://www.ezchip.com/html/pr_np-1c.html; Apr. 4, 2006; 5 pages.
*Finisar Xgig Analyzer Blades Hardware Guide*; Apr. 8, 2004; 22 pages.
*Finisar Xgig Analyzer User's Guide Fibre Channel, Infiniband, Gig-E*; Apr. 8, 2004; 124 pages.
*NP-1c Programming Overview White Paper*; Jul. 2004; 4 pages.
*Frequently Asked Questions, The Wayback Machine*; http://www.archive.org/about/faqs.php; Nov. 9, 2006; 48 pages.
*Cisco—What Does the show ip ospf interface Command Reveal?*; Sep. 9, 2004; 7 pages.
*Cisco—Preventing Duplicate EIGRP Router IDs*; Oct. 14, 2004; 7 pages.
*Cisco—Configuring IS—IS for IP on Cisco Routers*; Aug. 1, 2005; 8 pages.
*Cisco—Dial-on-demand Routing (DDR) with Easy IP and DHCP Server*; Oct. 24, 2005; 11 pages.
*Using OSPF Stub RouterAdvertisement Feature*; http://www.cisco.com/warp/public/cc/pd/iosw/prodlit/osfn_tc.htm; Apr. 10, 2006; 6 pages.
U.S. Appl. No. 10/218,343, filed Aug. 13, 2002, Farley et al.
U.S. Appl. No. 10/228,212, filed Aug. 26, 2002, Dubé et al.
U.S. Appl. No. 10/307,272, filed Nov. 27, 2002, Bain et al.
U.S. Appl. No. 10/424,361, filed Apr. 25, 2003, Foster et al.
U.S. Appl. No. 10/424,363, filed Apr. 25, 2003, Bain et al.
U.S. Appl. No. 10/424,364, filed Apr. 25, 2003, Bain et al.
U.S. Appl. No. 10/448,670, filed May 30, 2003, Cicchetti et al.
U.S. Appl. No. 10/448,827, filed May 30, 2003, Garcia et al.
U.S. Appl. No. 10/764,218, filed Jan. 23, 2004, Durham et al.
U.S. Appl. No. 11/344,829, filed Feb. 1, 2006, Lawson et al.
U.S. Appl. No. 11/344,883, filed Feb. 1, 2006, Schondelmayer et al.
U.S. Appl. No. 11/344,892, filed Feb. 1, 2006, Schondelmayer et al.
U.S. Appl. No. 11/344,893, filed Feb. 1, 2006, Schondelmayer et al.
U.S. Appl. No. 11/345,202, filed Feb. 1, 2006, Schondelmayer et al.
U.S. Appl. No. 11/537,590, filed Sep. 29, 2006, Noble et al.
U.S. Appl. No. 11/537,595, filed Sep. 29, 2006, Noble et al.
U.S. Appl. No. 11/537,599, filed Sep. 29, 2006, Noble et al.
U.S. Appl. No. 11/537,602, filed Sep. 29, 2006, Noble et al.
U.S. Appl. No. 11/930,677, filed Oct. 31, 2007, Noble et al.
U.S. Appl. No. 11/433,290, filed May 12, 2006, Foster.
P. Sharma et al., "Channel Models for Indoor Wireless Transmission," University of Massachusetts Lowell, Lowell, MA, 6 pages, Proceedings of International Conference on Third Generation Wireless and Beyond 2001.
O. Oteri and A. Paulraj, "Fading and Interference Mitigation in Multi-Antenna Wireless Transmission," Wireless Communications and Networking Conference, 2005 IEEE, Mar. 2005, 6 pages.
Finisar Xgig Analyzer User's Guide Fibre Channel, Gig-E; May 3, 2005, 164 pages.
Finisar NetWisdom 2.1 User's Guide; Jul. 2005, 316 pages.
Finisar NetWisdom 2.1 User's Guide, Sep. 2005, 316 pages.
"IEEE Standard Test Access Port and Boundary-Scan Architecture," Test Technology Standards Committee of the IEEE Computer Society, IEEE std 1149.1-2001 (2001).
IEEE Standard Test Access Port and Boundary-Scan Architecture, Test Technology Standards Committee of the IEEE Computer Society, IEEE Std 1149.1-1990 (1990).
Supplement to IEEE Std 1149.1-1990, IEEE Standard Test Access Port and Boundary-Scan Architecture, test Technology Standards Committee of the IEEE Computer Society (1995).

"Mercury LoadRunner 8.0," Copyright 2005 CNET Networks, Inc., http://downloads.zdnet.co.uk/0,39025604,39092344s,00.htm.
NP-1c: 10-Gigabit 7-Layer Network Processor with Integrated Search Engines, Product Brief; http://www.ezchip.com/images/pdfs/EZchip_NP-1c_Brief_online.pdf; Date Downloaded: Jul. 20, 2004; Copyright 2003; 2 pages.
Products & Solutions; http://www.ezchip.com/html/prod_r.html; Date Downloaded; Aug. 4, 2004; 2 pages.
NP-1 Family: The World's Most Highly Integrated 10-Gigabit 7 -Layer Network Processors;http://web.archive.org/web/20030214201226/www.ezchip.com/html/pr_np-1.html; Date Downloaded: Jul. 28, 2004; 5 pages.
Internet Archive, Frequently Asked Questions; http://www.archive.org/about/faqs.php; Date Downloaded: Jul. 28, 2004; 34 pages.
In-Line Taps: Full Duplex Single or Multi-port Ethernet and Fibre Channel Taps; Date Downloaded: Aug. 3, 2004; 2 pages.
SAN QoS ProbeFC; Date Downloaded: Aug. 3, 2004; 2 pages.
Tech Notes: Using Single Port Taps with IDS Systems; Date Downloaded: Aug. 3, 2004; 1 page.
Eberle, H. et al.; "Testing Systems Wirelessly." VLSI Test Symposium, 2004, 22nd IEEE Proceedings, Apr. 25-29, 2004, pp. 335-340.
U.S. Appl. No. 11/134,786, Jul. 23, 2008, Office Action.
U.S. Appl. No. 11/537,590, Mar. 25, 2009, Office Action.
U.S. Appl. No. 11/204,920, Mar. 18, 2008, Office Action.
U.S. Appl. No. 11/204,920, Oct. 3, 2008, Office Action.
U.S. Appl. No. 11/279,360, Mar. 19, 2008, Office Action.
U.S. Appl. No. 11/279,360, Oct. 1, 2008, Office Action.
U.S. Appl. No. 11/348,745, Sep. 8, 2008, Office Action.
U.S. Appl. No. 11/348,745, Mar. 26, 2009, Office Action.
U.S. Appl. No. 11/348,745, Apr. 24, 2009, Office Action.
U.S. Appl. No. 11/344,883, Dec. 24, 2008, Office Action.
U.S. Appl. No. 11/344,892, Jan. 27, 2009, Office Action.
U.S. Appl. No. 11/344,892, Jul. 18, 2008, Office Action.
U.S. Appl. No. 11/344,893, Jan. 5, 2009, Office Action.
U.S. Appl. No. 11/344,893, Jul. 22, 2008, Office Action.
U.S. Appl. No. 11/345,202, Jan. 27, 2009, Office Action.
U.S. Appl. No. 11/345,202, Jun. 26, 2008, Office Action.
U.S. Appl. No. 11/344,883, Mar. 10, 2010, Office Action.
U.S. Appl. No. 11/930,677, Jun. 9, 2010, Office Action.
United States Patent and Trademark Office, U.S. Appl. No. 11/344,892, Office Action mailed Aug. 18, 2009.
United States Patent and Trademark Office, U.S. Appl. No. 11/344,883, Office Action mailed Oct. 2, 2009.
United States Patent and Trademark Office, U.S. Appl. No. 11/685,548, Office Action mailed Nov. 2, 2009.
United States Patent and Trademark Office, U.S. Appl. No. 11/348,745, Office Action mailed Aug. 3, 2009.
United States Patent and Trademark Office, U.S. Appl. No. 11/776,226, Office Action mailed Aug. 13, 2009.
United States Patent and Trademark Office, U.S. Appl. No. 11/776,226, Amendment filed Jan. 13, 2010 in response to Office Action mailed Aug. 13, 2009.
United States Patent and Trademark Office, U.S. Appl. No. 11/776,226, Office Action mailed Mar. 9, 2010.
United States Patent and Trademark Office, U.S. Appl. No. 11/685,551, Office Action mailed Nov. 3, 2009.
United States Patent and Trademark Office, U.S. Appl. No. 11/537,590, Notice of Allowance mailed Aug. 28, 2009.
United States Patent and Trademark Office, U.S. Appl. No. 11/344,893, Office Action mailed Jul. 20, 2009.
United States Patent and Trademark Office, U.S. Appl. No. 11/204,920, Office Action mailed Jun. 9, 2009.
United States Patent and Trademark Office, U.S. Appl. No. 11/134,786, Office Action mailed May 12, 2009.
United States Patent and Trademark Office, U.S. Appl. No. 11/134,786, Amendment "B" filed Nov. 12, 2009 in response to Office Action mailed May 12, 2009.
United States Patent and Trademark Office, U.S. Appl. No. 11/134,786, Office Action mailed Dec. 4, 2009.
United States Patent and Trademark Office, U.S. Appl. No. 11/537,599, Office Action mailed Sep. 15, 2009.
United States Patent and Trademark Office, U.S. Appl. No. 11/744,591, Office Action mailed Jul. 31, 2009.

United States Patent and Trademark Office, U.S. Appl. No. 11/744,591, Amendment filed Feb. 1, 2010 in Response to Office Action mailed Jul. 31, 2009.

United States Patent and Trademark Office, U.S. Appl. No. 11/744,591, Office Action mailed May 10, 2010.

United States Patent and Trademark Office, U.S. Appl. No. 11/345,202, Office Action mailed Jul. 2, 2009.

United States Patent and Trademark Office, U.S. Appl. No. 11/279,360, Office Action mailed Jun. 11, 2009.

United States Patent and Trademark Office, U.S. Appl. No. 11/537,602, Office Action mailed Sep. 10, 2009.

United States Patent and Trademark Office, U.S. Appl. No. 11/537,595, Office Action mailed Sep. 16, 2009.

P. Sharma et al., "Interference in Indoor Wireless Channels," Center for Advanced Computation and Telecommunications, University of Massachusetts Lowell, May 11, 2005, pp. 1-10, Lowell, MA.

"LoadRunner Info," available online at http://www.wilsonmar.com/1loadrun.htm, accessed Apr. 15, 2005, 31 pages.

Seapine Software, QA Wizard, WinRunner Comparison, "QA Wizard vs. WinRunner—Are you paying too much for automated testing?", available online at http://www.seapine.com/qawvswinrunner.html, accessed Jun. 3, 2005, 6 pages.

"Testing and Code Analysis Tools," available online at http://www.laatuk.com/tools/testing_tools.html, accessed Jun. 3, 2005, 24 pages.

* cited by examiner

SYSTEMS FOR ORDERING NETWORK PACKETS

BACKGROUND OF THE INVENTION

1. Field of the Invention

The present invention generally relates to networking systems and in particular to ordering network messages.

2. Background Technology

Computer and data communications networks continue to proliferate due to declining costs, increasing performance of computer and networking equipment, and increasing demand for communication bandwidth. Communications networks—including wide area networks ("WANs"), local area networks ("LANs"), metropolitan area networks ("MANs"), and storage area networks ("SANS")—allow increased productivity and use of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET") and InfiniBand networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Network bandwidth, in particular, has been the driving consideration behind many advancements in the area of high speed communication systems, methods and devices.

For example, the ever-increasing demand for network bandwidth has resulted in the development of technology that increases the amount of data that can be pushed through a single channel on a network. Advancements in modulation techniques, coding algorithms and error correction have vastly increased the rates at which data can be transmitted across networks. For example, in the past, the highest rate that data could travel across a network was at about one Gigabit per second. This rate has increased to the point where data can travel across Ethernet and SONET networks at rates as high as 10 gigabits per second, or faster.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network topologies and protocols. Moreover, new network interconnection devices and software applications are constantly being introduced and implemented. Circumstances such as these highlight the need for effective, reliable, and flexible diagnostic mechanisms.

Unfortunately, some diagnostic mechanisms may be less efficient in performing various diagnostic functions on networks. In addition, some nodes may be less efficient in communicating via networks.

BRIEF SUMMARY OF EMBODIMENTS OF THE INVENTION

A need therefore exists for systems and methods that eliminate or reduce the disadvantages and problems listed above and/or other disadvantages and problems.

One aspect is a networking system that may comprise a processor and memory. The memory has stored thereon a routing data structure, a transaction data structure, and first packet-route-to data. The processor may be configured to receive a packet. The processor may also be configured to copy second route-to data from an entry in the routing data structure to the first packet-route-to data, the entry being associated with an identifier associated with the packet, the second route-to data comprising a value indicating that the packet should be routed back to the processor. The processor may also be configured to determine whether the packet is in order. The processor may also be configured to, when the packet is in order, copy third route-to data to the first packet-route-to data, the third route-to data comprising a value indicating that the packet should be routed to a destination. The processor may further be configured to route the packet according to the first packet-route-to data.

For purposes of summarizing, some aspects, advantages, and novel features have been described. Of course, it is to be understood that not necessarily all such aspects, advantages, or features will be embodied in any particular embodiment of the invention. Further, embodiments of the invention may comprise aspects, advantages, or features other than those that have been described. Some aspects, advantages, or features of embodiments of the invention may become more fully apparent from the following description and appended claims or may be learned by the practice of embodiments of the invention as set forth in this disclosure.

BRIEF DESCRIPTION OF THE DRAWINGS

The appended drawings contain figures of preferred embodiments to further clarify the above and other aspects, advantages and features of the present invention. It will be appreciated that these drawings depict only preferred embodiments of the invention and are not intended to limits its scope. The invention will be described and explained with additional specificity and detail through the use of the accompanying drawings in which.

DETAILED DESCRIPTION OF THE PREFERRED EMBODIMENTS

The present invention is generally directed towards a systems and methods for ordering network messages. The principles of the present invention, however, are not limited to ordering network messages. It will be understood that, in light of the present disclosure, the system disclosed herein can be successfully used in connection with other types of systems.

Figure 1:
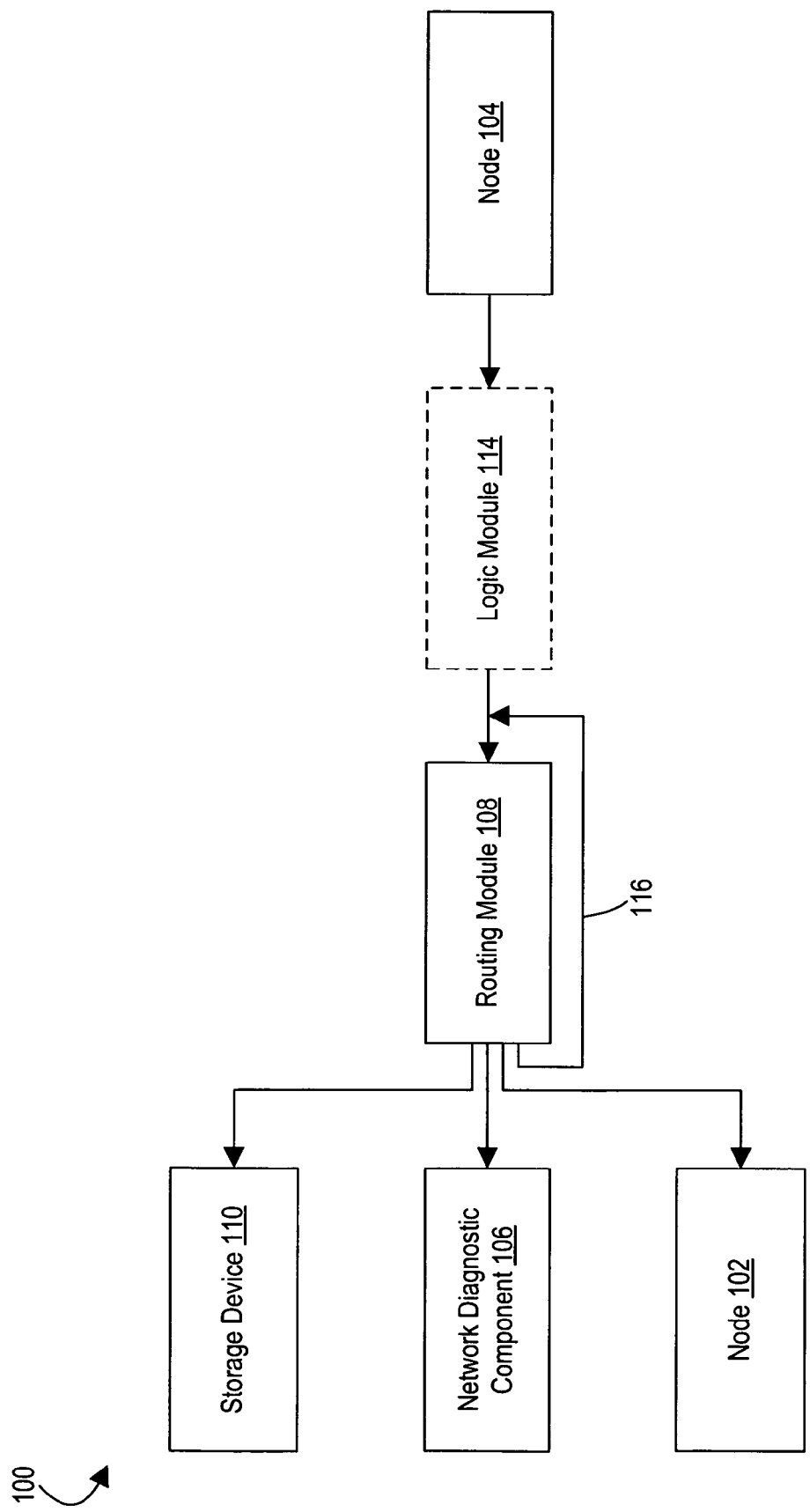
FIG. 1 is a block diagram of an exemplary embodiment of a networking system that may include a routing module.

As shown in FIG. 1, a networking system 100 may include one or more nodes, such as nodes 102, 104. As used herein, a "node" includes, but is not limited to, a server or host; a client or storage device; a switch; a hub; a router; all or a portion of a SAN fabric; a diagnostic device; and any device that may be coupled to a network and that may receive and/or monitor a signal or data over at least a portion of a network, that may send and/or generate a signal or data over at least a portion of a network, or both.

In one embodiment, a signal (such as, an electrical signal, an optical signal, and the like) may be used to send and/or receive network messages over at least a portion of a network. As used herein, a "network message" includes, but is not limited to, a packet; a datagram; a frame; a data frame; a command frame; an ordered set; any unit of data capable of being routed (or otherwise transmitted) through a computer network; and the like. In one embodiment, a network message may comprise transmission characters used for data purposes, protocol management purposes, code violation errors, and the like. Also, an ordered set may include, a Start of Frame ("SOF"), an End of Frame ("EOF"), an Idle, a Receiver_Ready ("R_DY"), a Loop Initialization Primitive ("LIP"), an Arbitrate ("ARB"), an Open ("OPN"), and Close ("CLS")—such as, those used in certain embodiments of Fibre Channel. Of course, any ordered sets and/or any network messages of any other size, type, and/or configuration may be used, including, but not limited to, those from any other suitable protocols.

Nodes may communicate using suitable network protocols, including, but not limited to, serial protocols, physical layer protocols, channel protocols, packet-switching protocols, circuit-switching protocols, Ethernet, Fast Ethernet, Gigabit Ethernet, 10 Gigabit Ethernet, Fibre Channel, Fibre Channel Arbitrated Loop ("FC-AL"), Small Computer System Interface ("SCSI"), High Performance Parallel Interface ("HIPPI"), Serial Attached SCSI ("SAS"), Serial ATA ("SATA"), SAS/SATA, Serial SCSI Architecture ("SSA"), and the like.

As shown in FIG. 1, the networking system 100 may include a network diagnostic component, such as a network diagnostic component 106. The network diagnostic component 106 may advantageous receive one or more network messages (or portions thereof) and may perform one or more network diagnostic functions using the received network messages (or portions thereof).

The networking system 100 may include a routing module 108. The routing module 108 may receive one or more network messages (or portions thereof), may reorder them, and may route them to a desired destination. For example, the routing module 108 may route the reordered network messages (or portions thereof) to the network diagnostic component 106, which preferably performs one or more network diagnostic functions using the reordered network messages (or portions thereof). Also, for example, the routing module 108 may route the reordered network messages (or portions thereof) to the node 102, which may use the reordered network messages (or portions thereof) to communicate with another node, such as the node 104. In addition, for example, the routing module 108 may route the reordered network messages (or portions thereof) to a storage device 110 for storage, which may allow the reordered network messages (or portions thereof) to be retrieved by or sent to, for example, a network diagnostic component.

Figure 2:
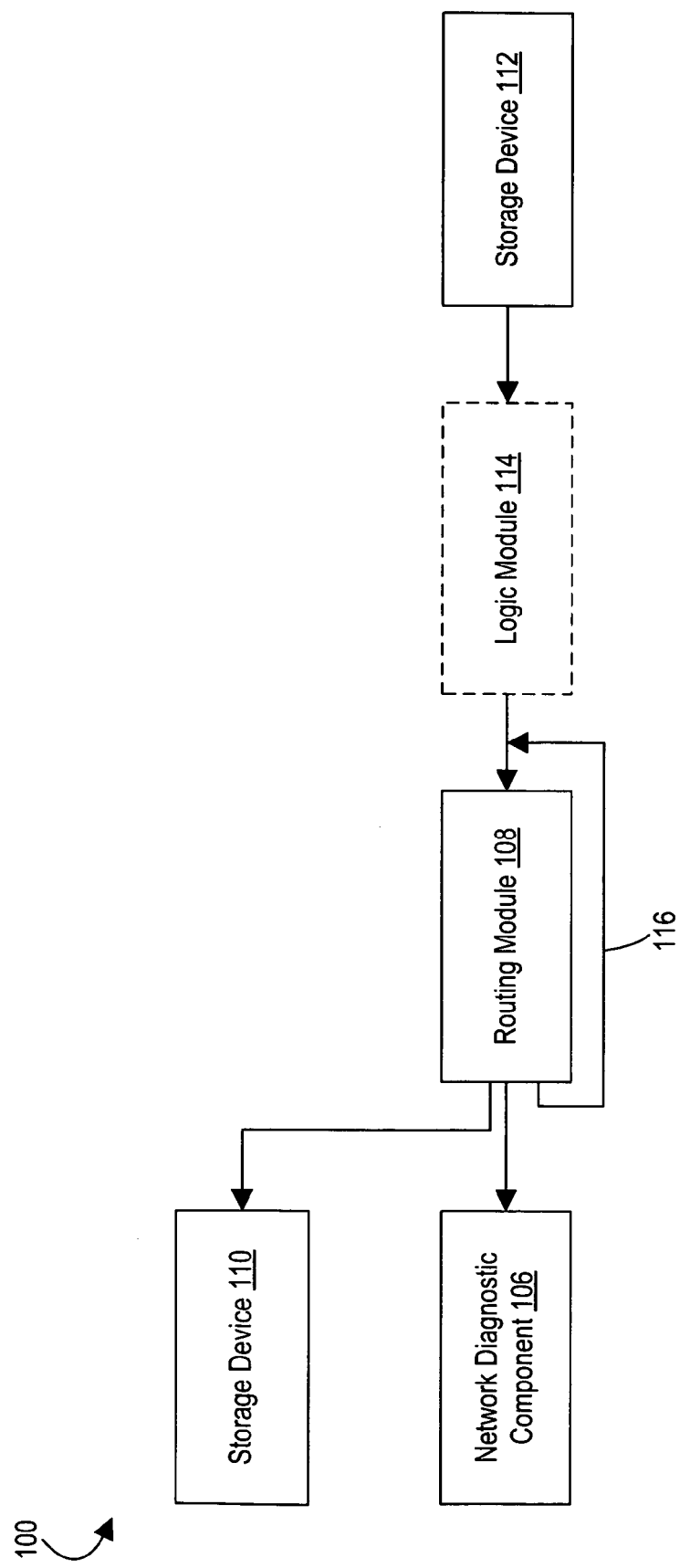
FIG. 2 is a block diagram of an exemplary embodiment of a networking system.

As shown in FIG. 2, the routing module 108 may receive one or more network messages (or portions thereof) from a storage device 112, may reorder them, and may route them to a desired destination. For example, the routing module 108 may route the reordered network messages (or portions thereof) to the network diagnostic component 106, which preferably performs one or more network diagnostic functions using the reordered network messages (or portions thereof). Also, for example, the routing module 108 may route the reordered network messages (or portions thereof) to the storage device 110, which may allow the reordered network messages (or portions thereof) to be retrieved by or sent to, for example, a network diagnostic component.

The routing module 108 preferably reorders the network messages (or portions thereof) to facilitate efficient use of the network messages by a node or a network diagnostic component. For example, some nodes may more efficiently communicate when it receives network messages in the order they were sent. Further, for example, some nodes may communicate in protocols that require that the nodes receive the network messages in the order they were sent. Also, for example, some network diagnostic components may more efficiently perform network diagnostic functions using network messages that are in the order they were sent.

As shown in FIGS. 1 and 2, the networking system 100 may include a logic module 114. The logic module 114 may receive one or more network messages, process the plurality of network messages into at least one message having an alternate structure; and to send the at least one message having an alternate structure to the routing module 108. The alternate structure may include, for example, a truncated portion of the network messages, timestamps, inter-packet meta data, other data, or any suitable combination thereof. Other suitable features of logic modules that may receive and process network messages are disclosed in U.S. patent application Ser. No. 11/345,202, filed Feb. 1, 2006 and entitled NETWORK DIAGNOSTIC SYSTEMS AND METHODS FOR PROCESSING NETWORK MESSAGES, which is incorporated by reference. It will be appreciated, however, that the networking system 100 does not require any logic modules 114.

As shown in FIGS. 1 and 2, the routing module 108 may access and/or include one or more route-backs 116. Advantageously, the routing module 108 may use the route back 116 to help reorder the network messages (or portions thereof) that it receives and routes. As used herein, the term "route-back" is a broad term, is used in its ordinary meaning, and includes, but is not limited to, one or more structures configured to allow a routing module to route a network message back to itself (that is, back to the routing module). It will be appreciated that a route back may be implemented using one or more pipelines, queues, other structures, or any combination thereof. In some embodiments, the routing module 108 may route the network messages (or portions thereof) according to order numbers of the network messages.

Figure 3:
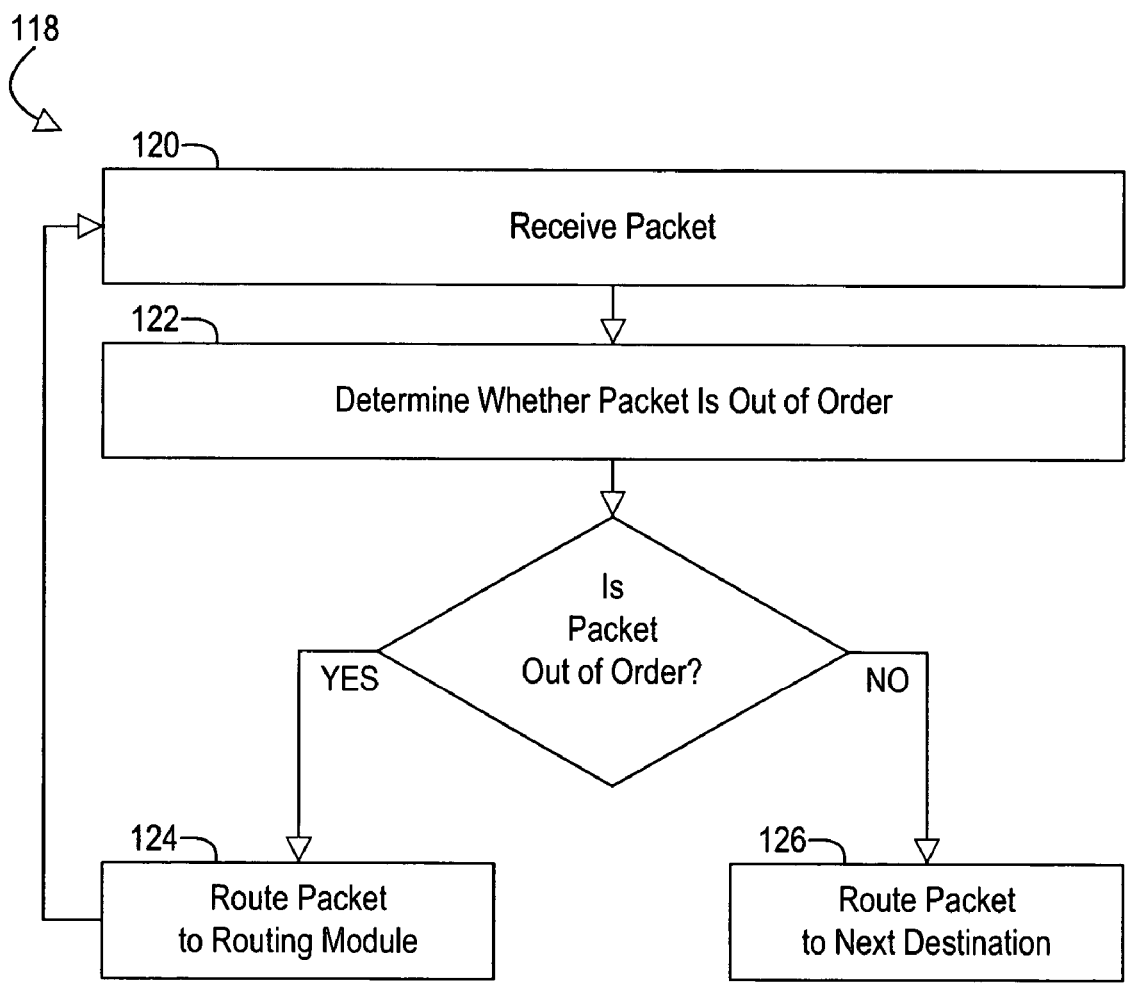
FIG. 3 is a flowchart illustrating an exemplary embodiment of a method.

In greater detail, as shown in FIG. 3, the routing module 108 may perform some or all of a method 118. At a block 120, the routing module 108 may receive a packet.

At the block 122, the routing module 108 may determine whether the received packet is out of order. For example, in one embodiment, the received packet may have an order number at least partially indicating the packet's position in a sequence of packets, and the routing module 108 may use that order number to determine whether the received packet is in order or out of order. In particular, at the block 122, the routing module 108 may use the order number to determine that it has not yet routed all of the packets (from the sequence of packets) that are earlier in the sequence than the received packet—and thus determine that the received packet is out of order. It will be appreciated that a variety of other suitable algorithms may be used to determine whether a received packet is in order.

If the received packet is out of order at the block 122, the routing module 108 may, at the block 124, route the received packet back to the routing module 108 to be evaluated again at the block 122. The routing module 108 may route the received packet back to itself using the route-back 116. If the packet is in order at the block 122, the routing module 108 may, at the block 126, route packet to a desired destination (such as, the storage device 110, the network diagnostic component 106, the node 102, or the like).

While the received packet is being routed back to the routing module 108 at the block 124, the routing module 108 may receive one or more other packets from the sequence of packets that are before the received packet in the sequence. Accordingly, the routing module 108 may route those other packets to a desired orientation and then route the received packet to the desired destination at the block 126. In one embodiment, the routing module 108 may route a received packet to itself at any of a plurality of various speeds. Accordingly, the routing module 108 may select to route a first received packet to itself at a first speed and route a second received packet to itself at a different second speed, which may be faster or slower than the first speed. In a further embodiment, to route the packets at different speeds, the routing module 108 may access and/or include a plurality of loop route-backs 116, which may be each configured to transmit packets at a different speed. In another further embodiment, to route the packets at different speeds, the routing module 108 may access and/or include a single route-back 116, which may be configured to transmit packets at different speeds. It will be appreciated, however, that the routing module 108 may be configured to route packets at the same speed or different speeds, if desired.

It will also be appreciated that some or all of the method 118 may be performed by the routing module 108; one or more other suitable modules, systems, and the like; or any suitable combination of one or more thereof. Of course, the entire method 118 need not be performed; and any part or parts of the method 118 may be performed to provide a useful method 118.

Figure 4:
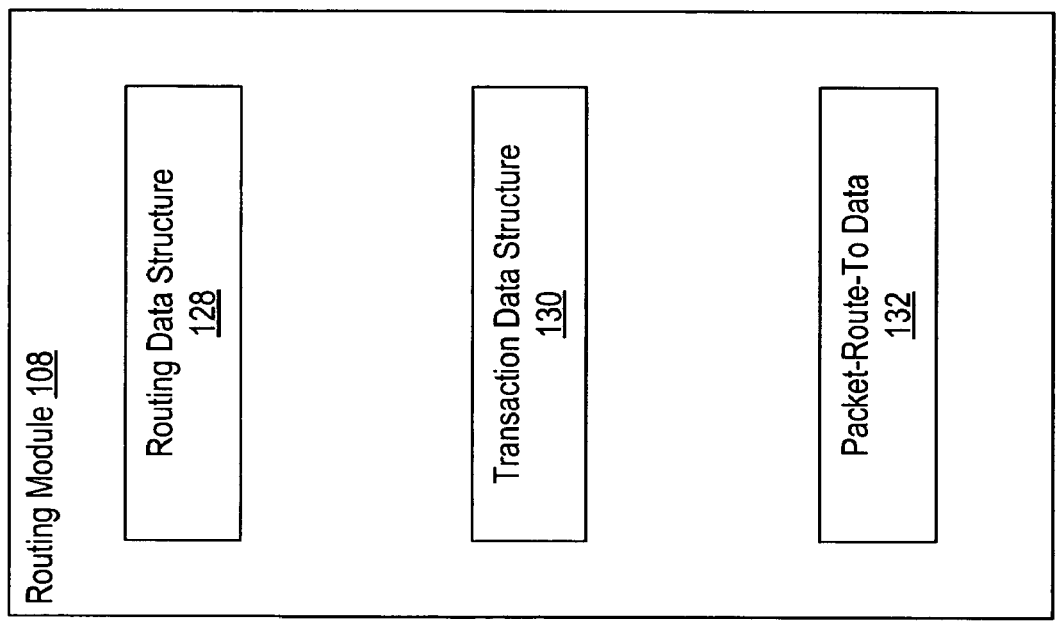
FIG. 4 is a block diagram of an exemplary embodiment of the routing module shown in FIG. 1.

As shown in FIG. 4, an exemplary embodiment of the routing module 108 (FIGS. 1 and 2) may include a routing data structure 128, a transaction data structure 130, and packet-route-to data 132. The data structure 128, a transaction data structure 130, and/or the packet-route-to data 132 may be stored at any suitable location in a register, in memory, in a hard disk drive, or in any other suitable storage device or devices. As used herein, "storage device" is a broad term and is used in its ordinary meaning and includes, but is not limited to, a hard disk drive, a tape drive, a redundant array of independent disks (RAID), a floppy disk, a CD-ROM or other optical disk, magnetic disk storage, memory, flash memory, nonvolatile memory (such as, memory with data that remains intact when the power is removed), volatile memory (such as, memory with data that is lost when the power is removed), random access memory (RAM), RAM cache, RAM made using complementary metal oxide semiconductor technology (CMOS RAM), read-only memory (ROM), programmable read-only memory (PROM), eraseable programmable read-only memory (EPROM), electrically eraseable programmable read-only memory (EEPROM), any other suitable computer-readable medium, any combination thereof, and the like. It will be appreciated, however, that the routing module 108 does not require the routing data structure 128, the transaction data structure 130 or the packet-route-to data 132 and that the routing module 108 may include other suitable structures and/or components.

Figure 5:
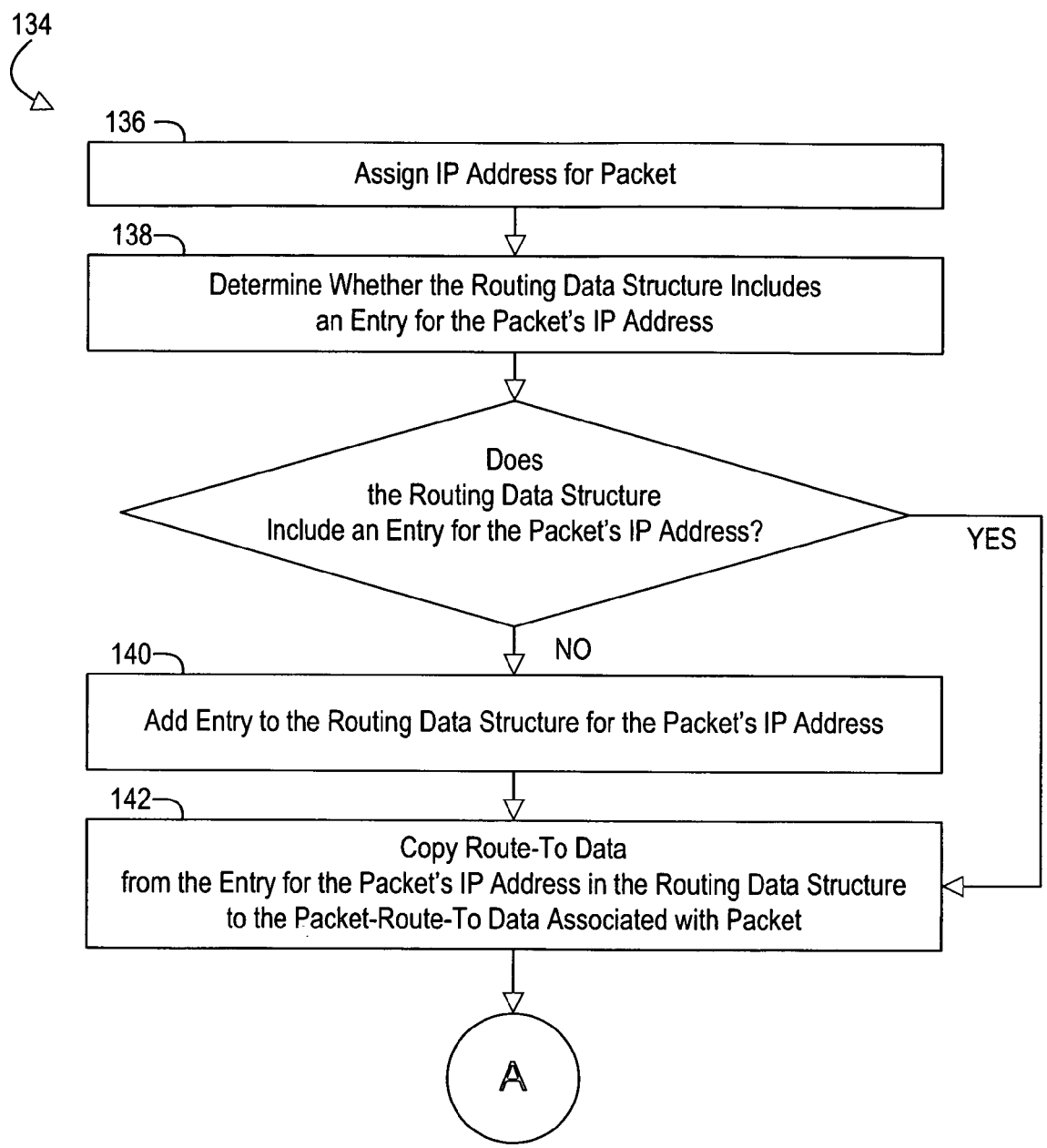
FIG. 5 is a flowchart illustrating a portion of an exemplary embodiment of a method.
Figure 6:
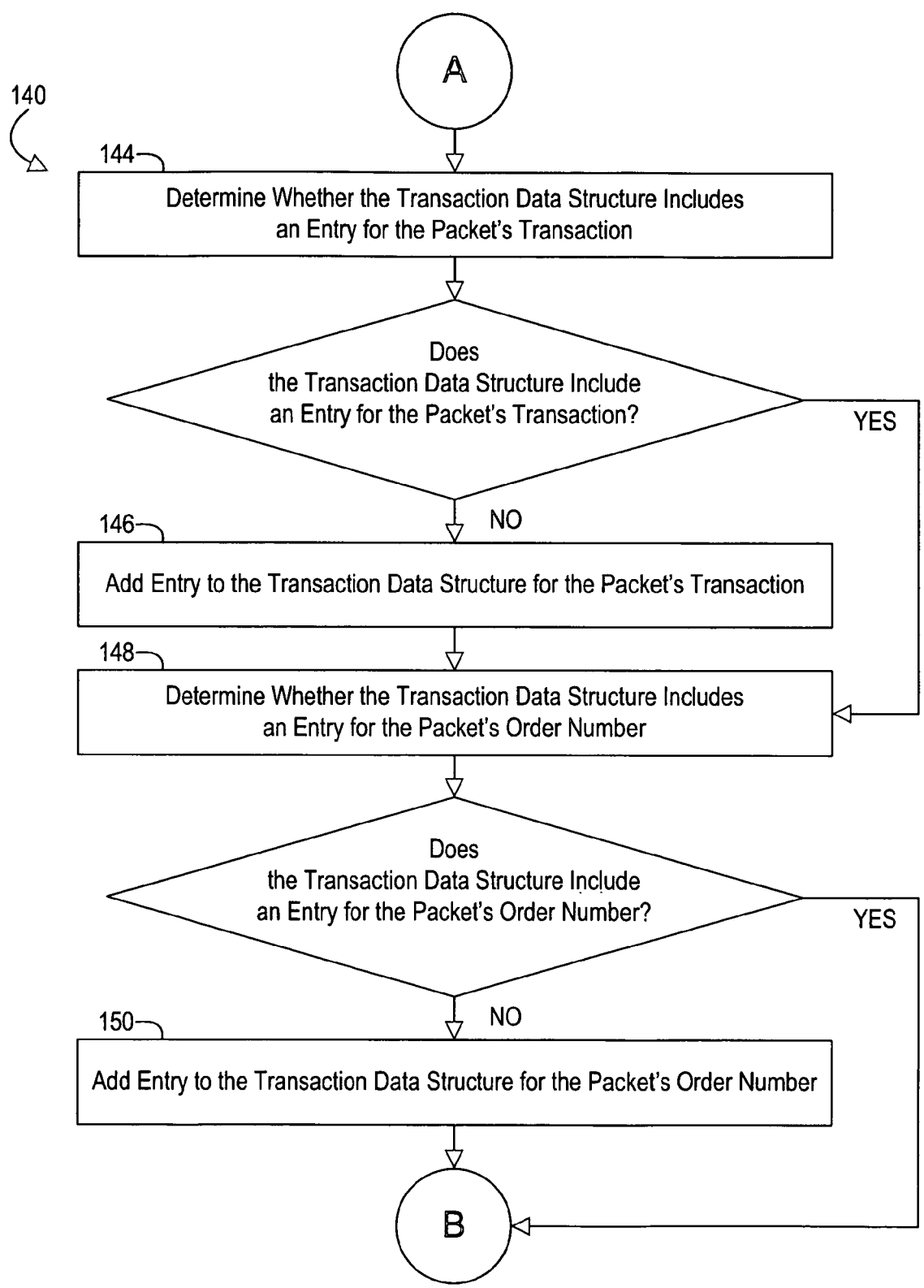
FIG. 6 is a flowchart illustrating another portion of the method shown in FIG. 5.
Figure 7:
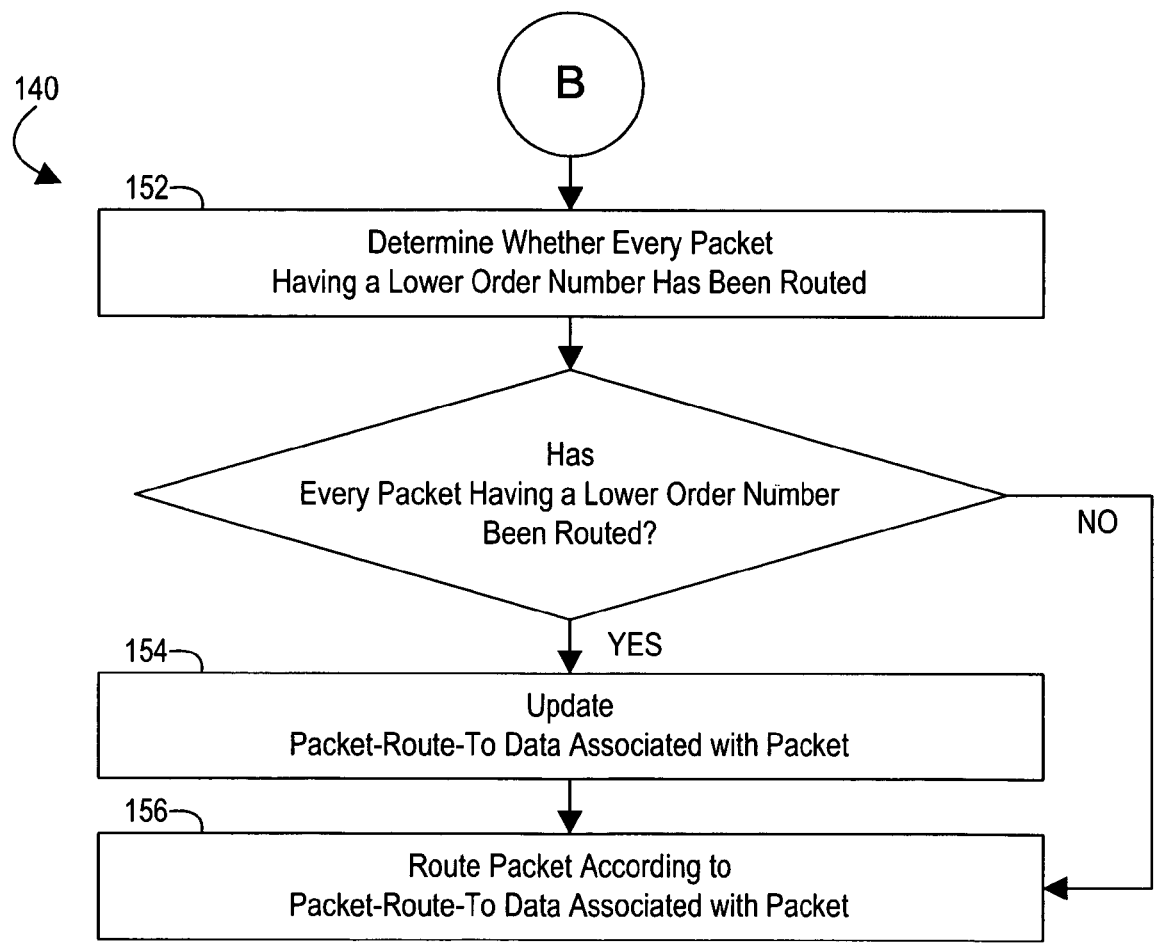
FIG. 7 is a flowchart illustrating yet another portion of the method shown in FIG. 5.

As shown in FIGS. 5-7, the exemplary embodiment of the routing module 108 shown in FIG. 4 may perform some or all of a method 134. It will be appreciated, however, that some or all of the method 134 may be performed by the routing module 108; one or more other suitable modules, systems, and the like; or any suitable combination of one or more thereof. Of course, the entire method 134 need not be performed; and any part or parts of the method 134 may be performed to provide a useful method 134.

As shown in FIG. 5, at a block 136, an identifier (for example, an IP address, another type of address, or any other value that may be used to identify one or more packets) may be assigned to a packet. The routing module 108 may store the packet's IP address in any suitable location, such as in memory, in a register or any other suitable location. In one embodiment, the routing module 108 may assign the IP address to the packet at the block 136. In one embodiment, the logic module 114 (FIGS. 1 and 2) may assign the IP address to the packet at the block 136 and may, if desired, insert the IP address in a portion of the packet.

At a block 138, the routing module 108 may determine whether the routing data structure 128 includes an entry for the packet's IP address, which was assigned at the block 136. If, at the block 138, the routing data structure 128 does not include an entry for the packet's IP address, the routing module 108 may add an entry for that IP address at the block 140 and then may proceed to the block 142. If, at the block 138, the routing data structure 128 does include an entry for the packet's IP address, the routing module 108 may proceed to the block 142.

The entry for the packet's IP address, which was assigned at the block 136, and the other entries for other IP addresses in the routing data structure 128 preferably include route-to data comprising a default value that indicates that the packet should be routed back to the routing module 108. Because the entries of the routing data structure 128 preferably include these default values, the routing data structure 128 may be created for some or all desired IP addresses and loaded in a single step—thus rendering blocks 138, 140 unnecessary in some embodiments. In one embodiment, these default values may be configured to route packets back to the routing module 108 at the same speed or different speeds, if desired.

At the block 142, the routing module 108 preferably copies route-to data from the entry for the packet's IP address to packet-route-to data 132 associated with the packet, and the routing module 108 then preferably proceeds to a block 144 (FIG. 6).

At the block 144 in FIG. 6, the routing module 108 may determine whether the transaction data structure 130 includes an entry for a transaction associated with the packet. If, at the block 144, the transaction data structure 130 does not include an entry for the transaction associated with the packet, the routing module 108 may add an entry for that transaction at the block 146 and then may proceed to the block 148. If, at the block 144, the transaction data structure 130 does include an entry for the transaction associated with the packet, the routing module 108 may proceed to the block 148. In one embodiment, the IP address assigned at the block 136 may be used as a transaction identifier. In particular, the entry for the transaction associated with the packet may include the IP address assigned at the block 136, which may be used as a key to identify the entry. It will be appreciated, however, that other transaction identifiers (such as those identifiers commonly used by networks to identify a transaction) may be used to identify a particular entry for a particular transaction.

At the block 148, the routing module 108 may determine whether the transaction data structure 130 includes an entry for the packet's order number in the packet's transaction. If, at the block 148, the transaction data structure 130 does not include an entry for the packet's order number in the packet's transaction, the routing module 108 may add an entry for that order number at the block 150 and then may proceed to a block 152 (FIG. 7). If, at the block 148, the transaction data structure 130 does include an entry for the packet's order number in the packet's transaction, the routing module 108 may proceed to the block 152.

Advantageously, the entry for the packet's order number may be configured to indicate that the routing module has received, routed, not received, and/or not routed the packet associated with the order number for a particular transaction. Accordingly, at the block 152, the routing module 108 may determine whether every packet from the packet's transaction having a lower order number has been routed to a desired destination (such as, the storage device 110, the network diagnostic component 106, the node 102, or the like) using, for example, the entries in the routing data structure 128.

If, at the block 152, every packet from the packet's transaction having a lower order number has been routed to the desired destination, the routing module 108 may proceed to a block 154 to update the packet-route-to data 132 associated with the packet to indicate that the packet should be routed to the desired destination and then proceed to a block 156. If, at the block 152, every packet from the packet's transaction having a lower order number has not been routed to the desired destination, the routing module 108 may proceed to a block 156, leaving the packet-route-to data 132 associated with the packet indicating that the packet should be routed back to the routing module 108.

At the block 156, the routing module 108 may route the packet according to the packet-route-to data 132 associated with the packet. Thus, if the packet-route-to data 132 associated with the packet indicates that the packet should be routed back to the routing module 108, the routing 108 routes the packet back to itself (using, for example, the route-back 116), where the routing module may repeat some or all of the method 134 for the packet. However, if the packet-route-to data 132 associated with the packet indicates that the packet should be routed to the desired destination, the routing 108 routes the packet to the desired destination and preferably updates the transaction data structure 130 (for example, the entry for the packet's order number in the packet's transaction) to indicate that the packet has been routed to the desired destination.

It will be appreciated that some or all of the method 134 may be repeatedly used for a plurality of received packets to help reorder the packets.

If desired, the routing module 108 may be implemented using a network processor unit ("NPU"), such as the NP-1c network processor available from EZchip Technologies Inc., which has its headquarters at 900 East Hamilton Avenue, Suite 100, Campbell, Calif. 95008, and has a website at www.ezchip.com. If desired some hardware automation provided by the network processor unit may be leveraged to perform parts of the method 134. Leveraging this hardware automation may allow the network processor to perform some or all of the method 134 at a relatively fast speed.

It will be appreciated that some or all of the method 134 may be performed using suitable hardware automation; however, hardware automation is not required. It will also be appreciated that the routing module 108 does not require the NP-1c or any other network processing unit.

Exemplary Network Diagnostic Functions

As mentioned above, the network diagnostic component 106 may perform one or more network diagnostic functions. A network diagnostic component, such as the network diagnostic component 106, may be configured to function as any combination of: a bit error rate tester, a protocol analyzer, a generator, a jammer, a monitor, and any other appropriate network diagnostic device.

Bit Error Rate Tester

In some embodiments, a network diagnostic component, such as the network diagnostic component 106, may function as a bit error rate tester. The bit error rate tester may generate and/or transmit an initial version of a bit sequence via a communication path. If desired, the initial version of the bit sequence may be user selected. The bit error rate tester may also receive a received version of the bit sequence via a communication path.

The bit error rate tester compares the received version of the bit sequence (or at least a portion of the received version) with the initial version of the bit sequence (or at least a portion of the initial version). In performing this comparison, the bit error rate tester may determine whether the received version of the bit sequence (or at least a portion of the received version) matches and/or does not match the initial version of the bit sequence (or at least a portion of the initial version). The bit error rate tester may thus determine any differences between the compared bit sequences and may generate statistics at least partially derived from those differences. Examples of such statistics may include, but are not limited to, the total number of errors (such as, bits that did not match or lost bits), a bit error rate, and the like.

It will be appreciated that a particular protocol specification may require a bit error rate to be less than a specific value. Thus, a manufacturer of physical communication components and connections (such as, optical cables), communication chips, other components used for communicating, and the like may use the bit error rate tester to determine whether their components comply with a protocol specified bit error rate. Also, when communication components are deployed, the bit error tester may be used to identify defects in a deployed physical communication path, which then may be physically inspected.

Protocol Analyzer

In some embodiments, a network diagnostic component, such as the network diagnostic component 106, may function as a protocol analyzer (or network analyzer), which may be used to capture data or a bit sequence for further analysis. The analysis of the captured data may, for example, diagnose data transmission faults, data transmission errors, performance errors (known generally as problem conditions), and/or other conditions.

As described below, the protocol analyzer may be configured to receive a bit sequence via one or more communication paths or channels. Typically, the bit sequence comprises one or more network messages, such as, packets, frames, or other protocol adapted network messages. Preferably, the protocol analyzer passively receives the network messages via passive network connections.

The protocol analyzer may be configured to compare the received bit sequence (or at least a portion thereof) with one or more bit sequences or patterns. Before performing this comparison, the protocol analyzer may optionally apply one or more bit masks to the received bit sequence. In performing this comparison, the protocol analyzer may determine whether all or a portion of the received bit sequence (or the bit masked version of the received bit sequence) matches and/or does not match the one or more bit patterns. In one embodiment, the bit patterns and/or the bit masks may be configured such that the bit patterns will (or will not) match with a received bit sequence that comprises a network message having particular characteristics such as, for example, having an unusual network address, having a code violation or character error, having an unusual timestamp, having an incorrect CRC value, indicating a link re initialization, and/or having a variety of other characteristics.

The protocol analyzer may detect a network message having any specified characteristics, which specified characteristics may be user-selected via user input. It will be appreciated that a specified characteristic could be the presence of an attribute or the lack of an attribute. Also, it will be appreciated that the network analyzer may detect a network message having particular characteristics using any other suitable method.

In response to detecting a network message having a set of one or more characteristics, the network analyzer may execute a capture of a bit sequence, which bit sequence may comprise network messages and/or portions of network messages. For example, in one embodiment, when the network analyzer receives a new network message, the network analyzer may buffer, cache, or otherwise store a series of network messages in a circular buffer. Once the circular buffer is filled, the network analyzer may overwrite (or otherwise replace) the oldest network message in the buffer with the newly received network message or messages. When the network analyzer receives a new network message, the network analyzer may detect whether the network message has a set of one or more specified characteristics. In response to detecting that the received network message has the one or more specified characteristics, the network analyzer may execute a capture (1) by ceasing to overwrite the buffer (thus capturing one or more network messages prior to detected message), (2) by overwriting at least a portion or percentage of the buffer with one or more newly received messages (thus capturing at least one network message prior to the detected message and at least network one message after the detected message), or (3) by overwriting the entire buffer (thus capturing one or more network messages after the detected message). In one embodiment, a user may specify via user input a percentage of the buffer to store messages before the detected message, a percentage of the buffer to store messages after the detected message, or both. In one embodiment, a protocol analyzer may convert a captured bit stream into another format.

In response to detecting a network message having a set of one or more characteristics, a network analyzer may generate a trigger adapted to initiate a capture of a bit sequence. Also, in response to receiving a trigger adapted to initiate a capture of a bit sequence, a network analyzer may execute a capture of a bit sequence. For example, the network analyzer may be configured to send and/or receive a trigger signal among a plurality of network analyzers. In response to detecting that a received network message has the one or more specified characteristics, a network analyzer may execute a capture and/or send a trigger signal to one or more network analyzers that are configured to execute a capture in response to receiving such a trigger signal. Further embodiments illustrating trigger signals and other capture systems are described in U.S. patent application Ser. No. 10/881,620 filed Jun. 30, 2004 and entitled PROPAGATION OF SIGNALS BETWEEN DEVICES FOR TRIGGERING CAPTURE OF NETWORK DATA, which is incorporated by reference.

It will be appreciated that a capture may be triggered in response to detecting any particular circumstance—whether matching a bit sequence and bit pattern, receiving an external trigger signal, detecting a state (such as, when a protocol analyzer's buffer is filled), detecting an event, detecting a multi network message event, detecting the absence of an event, detecting user input, or any other suitable circumstance.

The protocol analyzer may optionally be configured to filter network messages (for example, network messages having or lacking particular characteristics), such as, messages from a particular node, messages to a particular node, messages between or among a plurality of particular nodes, network messages of a particular format or type, messages having a particular type of error, and the like. Accordingly, using one or more bit masks, bit patterns, and the like, the protocol analyzer may be used to identify network messages having particular characteristics and determine whether to store or to discard those network messages based at least in part upon those particular characteristics.

The protocol analyzer may optionally be configured to capture a portion of a network message. For example, the protocol analyzer may be configured to store at least a portion of a header portion of a network message, but discard at least a portion of a data payload. Thus, the protocol analyzer may be configured to capture and to discard any suitable portions of a network message.

It will be appreciated that a particular protocol specification may require network messages to have particular characteristics. Thus, a manufacturer of network nodes and the like may use the protocol analyzer to determine whether their goods comply with a protocol. Also, when nodes are deployed, the protocol analyzer may be used to identify defects in a deployed node or in other portions of a deployed network.

Generator

In some embodiments, a network diagnostic component, such as the network diagnostic component 106, may function as a generator. The generator may generate and/or transmit a bit sequence via one or more communication paths or channels. Typically, the bit sequence comprises network messages, such as, packets, frames, or other protocol adapted network messages. The network messages may comprise simulated network traffic between nodes on a network. Advantageously, a network administrator may evaluate how the nodes (and/or other nodes on the network) respond to the simulated network traffic. Thus, the network administrator may be able to identify performance deviations and take appropriate measures to help avoid future performance deviations.

Jammer

In some embodiments, the network diagnostic component 106 may function as a jammer. The jammer may receive, generate, and/or transmit one or more bit sequences via one or more communication paths or channels. Typically, the bit sequences comprise network messages (such as, packets, frames, or other protocol adapted network messages) comprising network traffic between nodes on a network. The jammer may be configured as an inline component of the network such that the jammer may receive and retransmit (or otherwise forward) network messages.

Prior to retransmitting the received network messages, the jammer may selectively alter at least a portion of the network traffic, which alterations may introduce protocol errors or other types of errors. Thus, by altering at least a portion of the network traffic, the jammer may generate traffic, which traffic may be used to test a network. For example, a network administrator may then evaluate how the nodes on the network respond to these errors. For example, a network system designer can perform any one of a number of different diagnostic tests to make determinations such as whether a system responded appropriately to incomplete, misplaced, or missing tasks or sequences; how misdirected or confusing frames are treated; and/or how misplaced ordered sets are treated. In some embodiments, the network diagnostic component 106 may include any suitable amming (or other network diagnostic system or method) disclosed in U.S. Pat. No. 6,268,808 B1 to Iryami et al., entitled HIGH SPEED DATA MODIFICATION SYSTEM AND METHOD, which is incorporated by reference.

In one embodiment, to determine which network messages to alter, the jammer may be configured to compare a received bit sequence—such as a network message—(or a portion of the received bit sequence) with one or more bit sequences or patterns. Before performing this comparison, the jammer may optionally apply one or more bit masks to the received bit sequence. In performing this comparison, the jammer may determine whether all or a portion of the received bit sequence (or the bit masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a message to a particular node, a network message between or among a plurality of particular nodes, a network message of a particular format or type, and the like. Accordingly, the jammer may be configured to detect a network message having any specified characteristics. Upon detection of the network message having the specified characteristics, the jammer may alter the network message and/or one or more network messages following the network message.

Monitor

In some embodiments, a network diagnostic component, such as the network diagnostic component 106, may function as a monitor, which may be used to derive statistics from one or more network messages having particular characteristics, one or more conversations having particular characteristics, and the like.

As described below, the monitor may be configured to receive a bit sequence via one or more communication paths or channels. Typically, the monitor passively receives the network messages via one or more passive network connections.

To determine the network messages and/or the conversations from which statistics should be derived, the monitor may be configured to compare a received a bit sequence—such as a network message—(or a portion of the received bit sequence) with one or more bit sequences or patterns. Before performing this comparison, the monitor may optionally apply one or more bit masks to the received bit sequence. In performing this comparison, the monitor may determine whether all or a portion of the received bit sequence (or the bit masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a network message to a particular node, a network message between or among a plurality of particular nodes, a network message of a particular format or type, a network message having a particular error, and the like. Accordingly, the monitor may be configured to detect a network message having any specified characteristics—including but not limited to whether the network message is associated with a particular conversation among nodes.

Upon detecting a network message having specified characteristics, the monitor may create and update table entries to maintain statistics for individual network messages and/or for conversations comprising packets between nodes. For example, a monitor may count the number of physical errors (such as, bit transmission errors, CRC error, and the like), protocol errors (such as, timeouts, missing network messages, retries, out of orders), other error conditions, protocol events (such as, an abort, a buffer is full message), and the like. Also, as an example, the monitor may create conversation specific statistics, such as, the number of packets exchanged in a conversation, the response times associated with the packets exchanged in a conversation, transaction latency, block transfer size, transfer completion status, aggregate throughput, and the like. It will be appreciated that a specified characteristic could be the presence of an attribute or the lack of an attribute.

In some embodiments, the network diagnostic component may include any features and/or perform any method described in U.S. patent application Ser. No. 10/769,202, entitled MULTI-PURPOSE NETWORK NETWORK DIAGNOSTIC COMPONENTS and filed on Jan. 30, 2004, which is incorporated by reference.

Exemplary Operating and Computing Environments

The methods and systems described above can be implemented using software, hardware, or both hardware and software. For example, the software may advantageously be configured to reside on an addressable storage medium and be configured to execute on one or more processors. Thus, software, hardware, or both may include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits ("ASICs"), controllers, computers, and firmware to implement those methods and systems described above. The functionality provided for in the software, hardware, or both may be combined into fewer components or further separated into additional components. Additionally, the components may advantageously be implemented to execute on one or more computing devices. As used herein, "computing device" is a broad term and is used in its ordinary meaning and includes, but is not limited to, devices such as, personal computers, desktop computers, laptop computers, palmtop computers, a general purpose computer, a special purpose computer, mobile telephones, personal digital assistants (PDAs), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A networking system comprising:
    a processor and memory, the memory having stored thereon a routing data structure, a transaction data structure, and first packet-route-to data;
    the processor being configured to receive a packet; to copy second route-to data from an entry in the routing data structure to the first packet-route-to data, the entry being associated with an identifier associated with the packet, the second route-to data comprising a value indicating that the packet should be routed back to the processor; to determine whether the packet is in order; to, when the packet is in order, copy third route-to data to the first packet-route-to data, the third route-to data comprising a value indicating that the packet should be routed to a destination; and to route the packet according to the first packet-route-to data.

2. The networking system as in claim 1, wherein the destination comprises one of a storage device and a network diagnostic component.

3. The networking system as in claim 1, wherein the destination comprises a node.

4. The networking system as in claim 1, wherein the identifier comprises an address.

5. The networking system as in claim 4, wherein the identifier comprises an Internet Protocol (IP) address.

6. The networking system as in claim 1, wherein the processor is further configured to, when the packet is in order, route the packet to the destination.

7. The networking system as in claim 1, wherein the processor is further configured to receive the packet from a storage device.

8. The networking system as in claim 1, wherein the processor is further configured to select one of a plurality of routing speeds for routing the packet back to the processor.

* * * * *